C. J. MOORE.
ROBE SUPPORT.
APPLICATION FILED MAY 16, 1908.
1,143,772. Patented June 22, 1915.
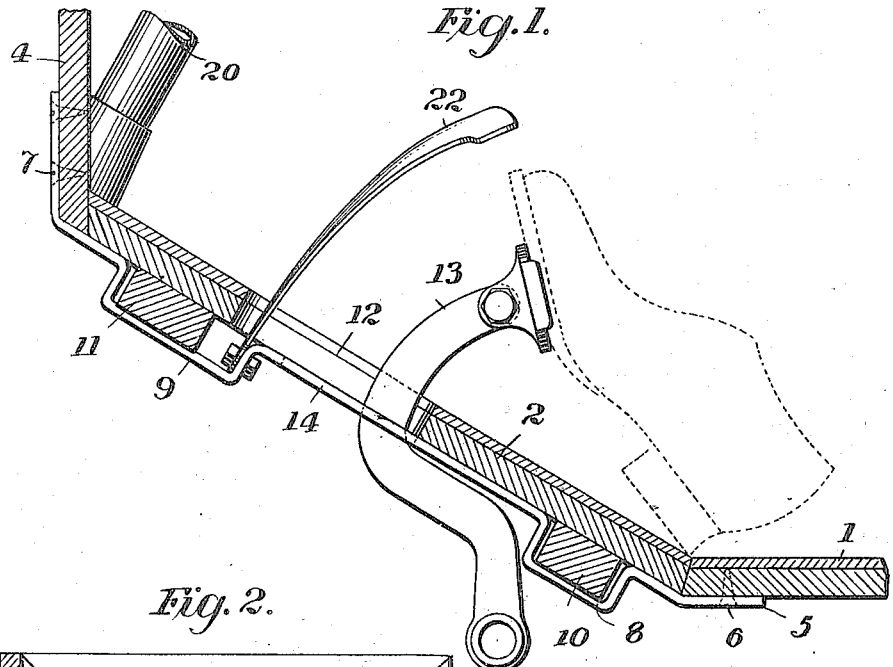
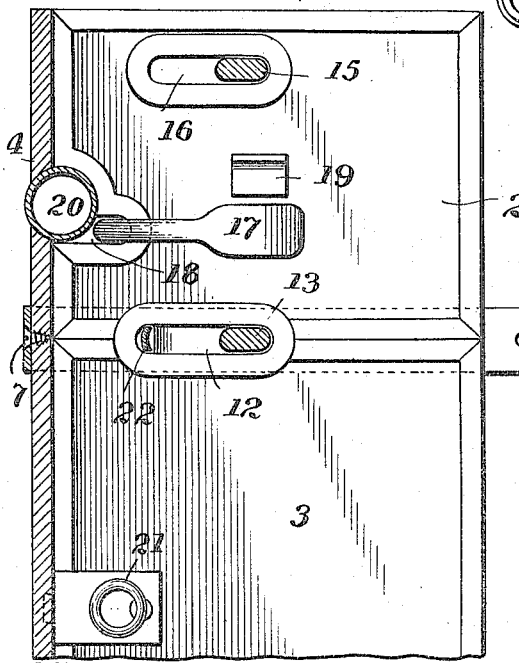
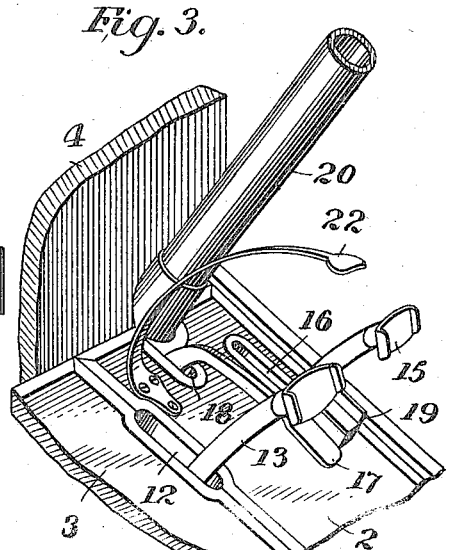
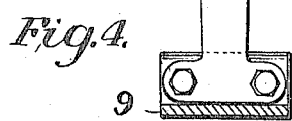
Inventor
Charles J. Moore

UNITED STATES PATENT OFFICE.

CHARLES J. MOORE, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

ROBE-SUPPORT.

1,143,772.

Specification of Letters Patent. Patented June 22, 1915.

Application filed May 16, 1908. Serial No. 433,309.

*To all whom it may concern:*

Be it known that I, CHARLES J. MOORE, a citizen of the United States, and residing at Detroit, in the county of Wayne and State of Michigan, have invented certain new and useful Improvements in Robe-Supports, of which the following is a specification.

This invention relates to motor vehicles, and particularly to means for supporting the robe or duster above the feet of the driver, so that the said robe or duster will not become entangled with the feet of the driver, and interfere with the proper operation of the controlling pedals of the machine.

It consists of a support of suitable form fastened to any convenient portion of the vehicle, projecting upwardly in advance of the pedals, and terminating approximately above them.

The invention will be fully understood from the following description taken in connection with the accompanying drawings.

In the drawings,—Figure 1 is a longitudinal section through a portion of the floor of a motor vehicle, showing my robe support in place; Fig. 2 is a plan view of what is shown in Fig. 1; Fig. 3 is a perspective view of a portion of the floor of a motor vehicle, showing a modified form of robe support; and Fig. 4 is a detail view of the means for fastening the support in place.

When the robe or duster which is ordinarily used in motor vehicles is allowed to drop from the driver's knees, over his feet, it is liable to become entangled with the controlling pedals, and to interfere with the proper operation of those pedals by the driver. According to my invention I place slightly in advance of the pedals an attachment which is in the shape of a curved support over which the robe or duster is to be placed, and by this means the robe or duster is held out of contact with the pedals, and does not interfere with the free movement of the feet of the driver. This attachment may be easily and conveniently applied to any ordinary motor vehicle and may be secured either to the floor, the frame, or the dash, as desired.

In the drawings, 1 represents the stationary horizontal floor board which is ordinarily used in motor vehicles.

2 and 3 represent the inclined floor boards which connect the stationary board 1 with the vehicle dash 4. The board 2 is ordinarily made stationary, and the board 3 removable, but it will be understood that the board 2 may also be removable. These two boards are supported at their outer edges by side sills on the vehicle frame, and at their inner edges they are supported by the metal strip 5 which is secured at one end to the board 1 by screws 6, and at its other end to the vehicle dash by screws 7. This metal strip overlaps the edges of the boards 2 and 3 and is provided with the depressions 8 and 9 to receive the strengthening cleats 10 and 11 on the under surface of the board 2. The meeting edges of the boards 2 and 3 are cut away at opposite points to form a slot 12 through which projects the clutch pedal 13, it being understood that there is a slot 14 in the strip 5 through which this pedal passes.

The brake pedal 15 passes through slot 16 in the board 2, and the accelerator pedal 17 passes through an opening 18 in the board 2. By the side of the end of the pedal 17 there is placed a rest 19 to support the foot of the driver, so that he may regulate the operation of this pedal nicely. The steering column 20 passes through the forward edge of the board 2 and is secured to the vehicle dash. The board 3 is secured in place by means of a catch operated by the ring 21, which ring serves as a means for raising the board.

As shown in Figs. 1 and 2, my robe support 22 is secured to the vertical portion of the depression 9 in the strip 5, and projects upwardly and rearwardly through the slot 12, formed between the edges of the boards 2 and 3. This places the support directly in advance of the clutch pedal, and since it terminates approximately above that pedal it will serve to keep the robe out of contact with it. This is my preferred means for securing the support in place, and it will be understood that I prefer to make the support of metal and of substantially the shape shown, although these features may be modified without departing from my invention. The movable board 3 is ordinarily raised by ring 21 so that it turns about the point of connection with the stationary board 1, as a pivot, and it will be observed that the curvature of the support 22 is such that the board may be so turned without interfering with the support.

In the modified form shown in Fig. 3, my support consists merely in a curved metal strip fastened directly to the floor board in advance of the pedals by means of screws.

What I claim is:

1. In a motor vehicle, the combination with floor boards having a slot therein, of a controlling pedal projecting through said slot, and a robe support projecting through said slot in advance of the pedal.

2. In a motor vehicle, the combination with the floor boards having a slot formed between their meeting edges, one of said boards being movable, of a controlling pedal projecting through said slot, and a robe support secured to the vehicle and projecting through said slot in advance of the pedal.

3. In a motor vehicle, the combination with the floor boards having a slot formed between their meeting edges, one of said boards being movable, of a controlling pedal projecting through said slot, a supporting strip below the meeting edges of the floor boards provided with a slot for the controlling pedal, and a robe support secured to said strip and projecting upwardly through the slot in the floor boards.

4. In a motor vehicle, the combination with a movable floor board provided with a slot, of a support for said board provided with a slot, a controlling pedal extending through said slots, and a robe support passing through the slot in the board and secured to the support.

5. In a motor vehicle, the combination with the floor boards having a slot formed between their meeting edges, one of said boards being movable, of a controlling pedal projecting through said slot, transverse strengthening cleats on the under surface of one of said boards, a supporting strip below the meeting edges of the floor boards provided with depressions to receive the cleats, and a robe support secured to a vertical wall of one of said depressions and projecting upwardly through the slot in the floor boards.

In testimony whereof I affix my signature in presence of two witnesses.

CHARLES J. MOORE.

Witnesses:
L. C. TENNEY,
CLARA I. DALE.

Copies of this patent may be obtained for five cents each, by addressing the "Commissioner of Patents, Washington, D. C."